United States Patent
Higuchi

(10) Patent No.: US 8,320,507 B2
(45) Date of Patent: Nov. 27, 2012

(54) MOBILE COMMUNICATION SYSTEM, RECEIVING DEVICE, AND METHOD

(75) Inventor: Kenichi Higuchi, Saitama (JP)

(73) Assignee: NTT DoCoMo, Inc., Tokyo (JP)

( * ) Notice: Subject to any disclaimer, the term of this patent is extended or adjusted under 35 U.S.C. 154(b) by 253 days.

(21) Appl. No.: 12/864,888

(22) PCT Filed: Jan. 30, 2009

(86) PCT No.: PCT/JP2009/051626
§ 371 (c)(1),
(2), (4) Date: Aug. 25, 2010

(87) PCT Pub. No.: WO2009/099013
PCT Pub. Date: Aug. 13, 2009

(65) Prior Publication Data
US 2010/0329393 A1    Dec. 30, 2010

(30) Foreign Application Priority Data

Feb. 4, 2008   (JP) ................................. 2008-024355
Dec. 10, 2008  (JP) ................................. 2008-315035

(51) Int. Cl.
H04L 27/06  (2006.01)
(52) U.S. Cl. ........................................ 375/340; 375/259
(58) Field of Classification Search .......... 375/259–260, 375/316, 340
See application file for complete search history.

(56) References Cited

U.S. PATENT DOCUMENTS

| | | | | |
|---|---|---|---|---|
| 8,199,841 B1* | 6/2012 | Sarrigeorgidis et al. | ...... | 375/267 |
| 2006/0245513 A1* | 11/2006 | Koo et al. | ...... | 375/267 |
| 2006/0285531 A1* | 12/2006 | Howard et al. | ...... | 370/343 |
| 2008/0256426 A1* | 10/2008 | Reid et al. | ...... | 714/801 |
| 2009/0028265 A1* | 1/2009 | Lee et al. | ...... | 375/267 |
| 2009/0116588 A1* | 5/2009 | McNamara et al. | ...... | 375/340 |
| 2009/0154604 A1* | 6/2009 | Lee et al. | ...... | 375/340 |
| 2009/0310656 A1* | 12/2009 | Maltsev et al. | ...... | 375/219 |
| 2009/0323840 A1* | 12/2009 | Lee et al. | ...... | 375/260 |
| 2010/0014617 A1* | 1/2010 | Koo et al. | ...... | 375/343 |
| 2010/0316169 A1* | 12/2010 | Uln et al. | ...... | 375/340 |

FOREIGN PATENT DOCUMENTS

JP    2006-222743 A    8/2006

(Continued)

OTHER PUBLICATIONS

Patent Abstracts of Japan, Publication No. 2006-222743, dated Aug. 24, 2006, 1 page.

(Continued)

Primary Examiner — Jean B Corrielus
(74) Attorney, Agent, or Firm — Osha Liang LLP

(57) ABSTRACT

A transmitting device Fourier-transforms symbols in a transmission symbol sequence, maps the Fourier-transformed symbols to subcarriers, inverse-Fourier-transforms the mapped symbols, and transmits the inverse-Fourier-transformed symbols from multiple transmitting antennas. A receiving device Fourier-transforms received signals, extracts signal components mapped to the subcarriers, and estimates the symbols transmitted via the subcarriers by applying a QR decomposition algorithm to the extracted signal components. The receiving device obtains a unitary matrix $Q^H$ such that the product of the unitary matrix $Q^H$, a weight matrix W determining a correspondence between the transmission symbol sequence and the subcarriers, and a channel matrix H becomes a triangular matrix R, and estimates candidates of the symbols transmitted from the transmitting antennas based on the unitary matrix $Q^H$ and the triangular matrix R.

8 Claims, 7 Drawing Sheets

FOREIGN PATENT DOCUMENTS

WO 2007/124761 A1 11/2007

OTHER PUBLICATIONS

H. Kawai, et al., "Complexity-reduced Maximum Likelihood Detection Based on Replica Candidate Selection with QR Decomposition Using Pilot-Assisted Channel Estimation and Ranking for MIMO Multiplexing Using OFCDM," IEICE Technical Report, vol. 103, No. 680, Feb. 25, 2004, RCS2003-312, 8 pages.

D. Greico, et al., "Uplink Single-User MIMO for 3GPP LTE," Personal, Indoor and Mobile Radio Communications, 2007. PIMRC 2007. IEEE 18th International Symposium, Sep. 7, 2007, pp. 1-5, 5 pages.

H. Myung, et al., "Peak Power Characteristics of Single Carrier FDMA MIMO Precoding System," Vehicular Technology Conference, 2007. VTC-2007 Fall. 2007 IEEE 66th, Oct. 3, 2007, pp. 477-481, 5 pages.

K. Kim, et al., "Joint Channel Estimation and Data Detection Algorithms for MIMO-OFDM Systems," Proc. 36th Asilomar Conference on Signals, Systems and Computers, Nov. 2002, pp. 1857-1861, 5 pages.

International Search Report issued in PCT/JP2009/051626, mailed on Apr. 21, 2009, with translation, 9 pages.

Office Action for Japanese Patent Application No. 2008-315035 mailed Jul. 24, 2012, with English translation thereof (4 pages).

Takmi Itoh et al., "Comparison of Complexity-reduced Maximum Likelihood Detection Based on Symbol Replica-Candidate Selection with QR Decomposition on Throughput and Computational Complexity in OFCDM MIMO Multiplexing," IEICE Technical Report, vol. 103, No. 683, Feb. 25, 2004, pp. 61-66 (7 pages).

Hidekazu Taoka et al., "Field Experiments on 50 Bit/Sec/Hz Efficiency Using MLD Signal Detection in MIMO-OFDM Broadband Packet Radio Access," IEICE Technical Report, vol. 107, No. 38, May 10, 2007, pp. 53-58 (7 pages).

* cited by examiner

MOBILE COMMUNICATION SYSTEM, RECEIVING DEVICE, AND METHOD

TECHNICAL FIELD

The present invention generally relates to mobile communication technologies. More particularly, the present invention relates to a mobile communication system, a receiving device, and a method adapted for single-carrier multiple input multiple output (MIMO) transmission.

BACKGROUND ART

In multicarrier transmission schemes, a frequency band is divided into multiple narrow frequency bands (subcarriers) and separate signals are transmitted using the subcarriers. For example, in orthogonal frequency division multiple access (OFDMA), subcarriers are arranged such that they become orthogonal to each other to improve frequency efficiency and to achieve high-speed, high-volume communications. OFDMA makes it possible to effectively reduce inter-subcarrier interference. This in turn makes it possible to concurrently transmit signals using subcarriers and to increase the symbol length. Also with OFDMA, it is possible to effectively reduce multipath interference by using a relatively long guard interval.

With multicarrier transmission schemes, however, fairly-high peak power is instantaneously necessary for transmission because signals mapped to subcarriers overlap each other in the time domain. In other words, with multicarrier transmission schemes, the peak-to-average power ratio (PAPR) may become fairly high. This is not preferable particularly for mobile terminals.

Generally, single-carrier transmission schemes have an advantage in terms of reducing the PAPR. Particularly, single-carrier transmission schemes such as single-carrier frequency division multiple access (SC-FDMA) and discrete Fourier transform (DFT) spread OFDM also make it possible to efficiently use a wide frequency band. In SC-FDMA, a transmission signal is Fourier-transformed and mapped to subcarriers, and the mapped signal is inverse-Fourier-transformed and wirelessly transmitted. At the receiving end, a received signal is Fourier-transformed, signal components mapped to the subcarriers are extracted, and transmission symbols are estimated. Such single-carrier transmission schemes are preferable in terms of efficiently using a frequency band while reducing the PAPR.

Meanwhile, with single-carrier transmission schemes where subcarriers with a relatively large bandwidth are used, multipath interference tends to occur. Multipath interference increases as the transmission rate increases. For example, multipath interference becomes particularly prominent when the data modulation level is high or a MIMO multiplexing scheme is used. Increase in multipath interference in turn reduces the detection accuracy of signals at the receiving end.

Let us assume that the number of transmitting antennas is N, the data modulation level is B (e.g., when 16 QAM is used, B=4), the expected number of multipaths is P, and a maximum likelihood detection (MLD) method is used for signal detection (for a QRM-MLD method, see, for example, K. J. Kim, et al., "Joint channel estimation and data detection algorithm for MIMO-OFDM systems", Proc. 36th Asilomar Conference on Signals, Systems and Computers, November 2002). As described above, OFDMA makes it possible to effectively reduce inter-subcarrier interference and to sufficiently reduce multipath interference within a guard interval. Therefore, with OFDMA, the total number of symbol candidates that need to be examined at the receiving end is represented by the following formula:

$$2^{N \times B}$$

Meanwhile, with a single-carrier transmission scheme where multipath interference cannot be ignored, the total number of symbol candidates that need to be examined is represented by the following formula:

$$2^{N \times B \times P}$$

Thus, with a single-carrier transmission scheme, the number of candidates increases exponentially according to the number of multipaths and as a result, the computational complexity for signal detection increases. This in turn makes it difficult to employ an MLD method, which provides high detection accuracy but require high computational complexity, together with a single-carrier MIMO transmission scheme. Signal detection methods such as a zero forcing (ZF) method and a minimum mean squared error (MMSE) method require low computational complexity, but may reduce the signal detection accuracy. To achieve desired signal quality (desired SINR) when the signal detection accuracy at the receiving end is low, it is necessary to increase the transmission power of signals. However, since one purpose of employing a single-carrier transmission scheme is to reduce the PAPR and thereby to save battery energy, it is not preferable to increase the transmission power.

DISCLOSURE OF INVENTION

Problems to be Solved by the Invention

One object of the present invention is to improve the signal detection accuracy at a receiving end in a mobile communication system employing a single-carrier MIMO scheme and SC-FDMA.

Means for Solving the Problems

An aspect of the present invention provides a mobile communication system employing a single-carrier MIMO transmission scheme and including a transmitting device and a receiving device.

The transmitting device includes a mapping unit configured to map Fourier-transformed and weighted symbols in a transmission symbol sequence to subcarriers, an inverse Fourier transform unit configured to inverse-Fourier-transform the mapped symbols, and a transmitting unit configured to transmit a signal including the inverse-Fourier-transformed symbols from multiple transmitting antennas.

The receiving device includes an extracting unit configured to Fourier-transform signals received by multiple receiving antennas and to extract signal components mapped to the subcarriers from the signals, and a signal detection unit configured to estimate the symbols transmitted via the subcarriers by applying a QR decomposition algorithm to the extracted signal components.

The signal detection unit includes a decomposition unit configured to obtain a unitary matrix such that the product of the unitary matrix, a weight matrix determining a correspondence between the transmission symbol sequence and the subcarriers, and a channel matrix indicating radio channel conditions between the transmitting antennas and the receiving antennas becomes a triangular matrix; and an estimation unit configured to estimate candidates of the symbols transmitted from the transmitting antennas based on the triangular matrix and a vector obtained by multiplying a received vector, which includes the signal components received by the receiving antennas, by the unitary matrix.

ADVANTAGEOUS EFFECT OF THE INVENTION

An aspect of the present invention makes it possible to improve the signal detection accuracy at a receiving end in a mobile communication system employing a single-carrier MIMO scheme and SC-FDMA.

EXPLANATION OF REFERENCES

Figure 1:
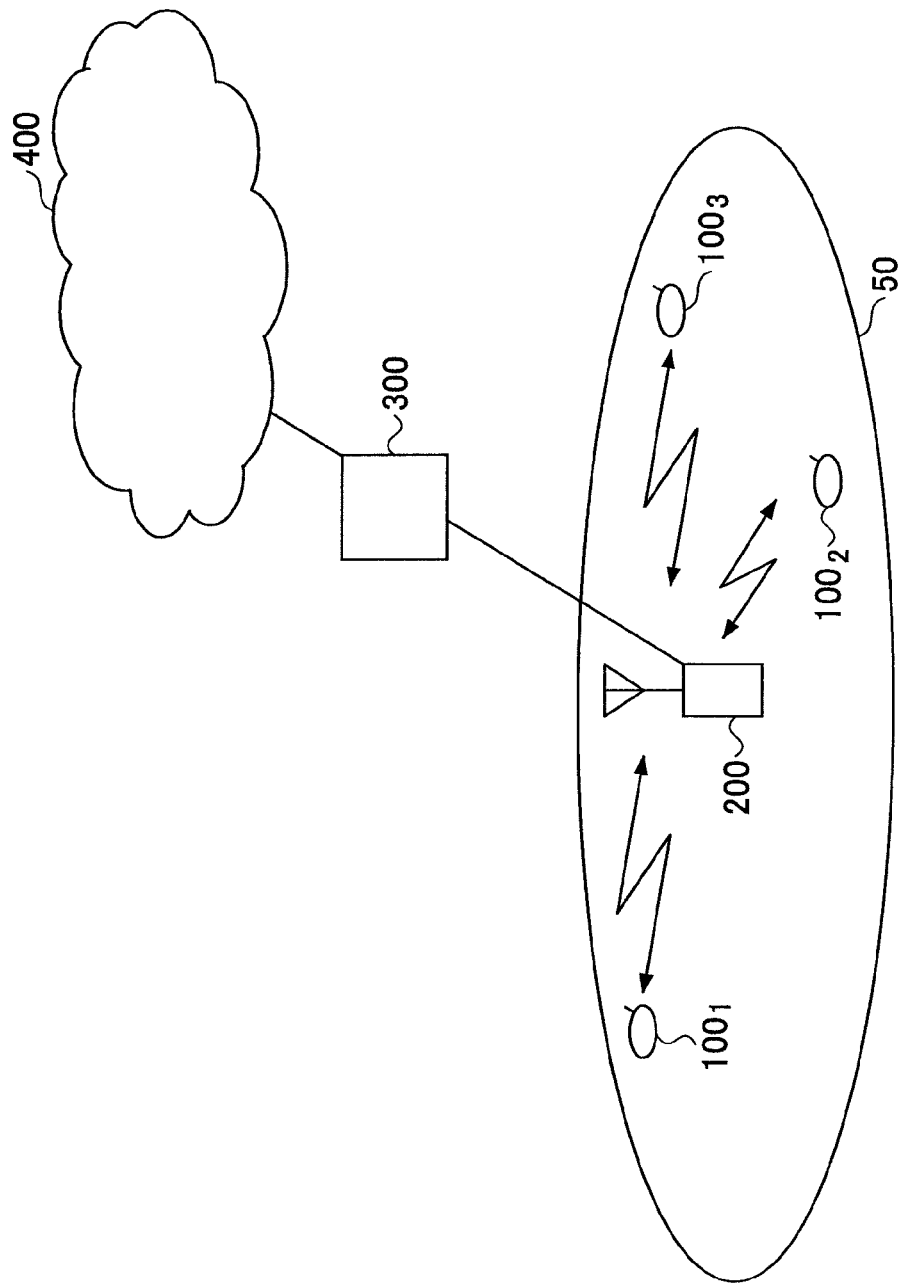
FIG. 1 is a drawing illustrating a mobile communication system according to an embodiment of the present invention.

50 Cell
100 User device (UE)
200 Base station (eNB)
300 Access gateway
400 Core network
21 Discrete Fourier transform unit (DFT)
22 Frequency domain mapper
23 Inverse fast Fourier transform unit (IFFT)
24 Guard interval adding unit
41 Guard interval removing unit (−CP)
42 Fast Fourier transform unit (FFT)
43 Frequency domain demapper
44 Signal detection unit
62 Channel estimation unit
64 Permutation control unit
210 QR decomposition unit
212 Signal transformation unit
214 Maximum likelihood detection unit
215 Likelihood output unit
216-1-261-4 Determining unit

BEST MODE FOR CARRYING OUT THE INVENTION

An aspect of the present invention provides a receiving device for a mobile communication system employing a single-carrier MIMO transmission scheme and SC-FDMA. The receiving device includes an extracting unit configured to Fourier-transform signals received by multiple receiving antennas and to extract signal components mapped to subcarriers from the signals, and a signal detection unit configured to estimate symbols transmitted via the subcarriers by applying a QR decomposition algorithm to the extracted signal components. The signal detection unit includes a decomposition unit configured to obtain a unitary matrix $Q^H$ such that the product of the unitary matrix $Q^H$, a weight matrix W determining a correspondence between a transmission symbol sequence and the subcarriers, and a channel matrix H indicating radio channel conditions between transmitting antennas and the receiving antennas becomes a triangular matrix R; and an estimation unit configured to estimate candidates x of the symbols transmitted from the transmitting antennas based on the triangular matrix R and a vector obtained by multiplying a received vector Y, which includes the signal components received by the receiving antennas, by the unitary matrix $Q^H$.

Using a QR decomposition algorithm at the receiving end in a mobile communication system employing a single-carrier MIMO scheme makes it possible to reduce the computational complexity in signal detection as well as to improve the signal detection accuracy. Improved signal detection accuracy in turn makes it possible to reduce transmission power necessary to maintain desired quality. This approach is particularly preferable when the transmitting end is a user device. Using a QR decomposition algorithm also makes it possible to efficiently perform an equalization process in the frequency domain and a signal separation process based on, for example, MLD.

The signal detection unit may further include a determining unit configured to calculate metrics for the respective candidates of the symbols and to narrow down the candidates based on the metrics. The metrics may indicate square Euclidean distances on a symbol constellation between received symbols and the candidates of the symbols. Thus, reducing the computational complexity in signal detection makes it possible to use an MLD method together with a single-carrier MIMO transmission scheme. This in turn makes it possible to further improve the signal detection accuracy.

The receiving device may further include a permutation control unit configured to input a control signal for permuting rows or columns of a matrix product of the channel matrix and the weight matrix to the decomposition unit. In this case, the decomposition unit may be configured to obtain the triangular matrix and the unitary matrix such that the product of the triangular matrix and the unitary matrix equals the matrix product the rows or the columns of which are permuted according to the control signal.

The permutation control unit may be configured to generate the control signal such that when the estimation unit estimates the symbols according to an M algorithm, the symbols from one of the transmitting antennas corresponding to higher received power are estimated prior to the symbols from another one of the transmitting antennas corresponding to lower received power.

Alternatively, the permutation control unit may be configured to generate the control signal such that the estimation unit estimates a first subcarrier component of the symbols transmitted from a first one of the transmitting antennas and then estimates a first subcarrier component of the symbols transmitted from a second one of the transmitting antennas.

Although specific values are used in the descriptions below to facilitate the understanding of the present invention, the values are just examples and other appropriate values may also be used unless otherwise mentioned.

Below, the following aspects of the present invention are described as preferred embodiments:
1. System
2. Transmitting device
3. Receiving device
4. Operations
5. Details of signal detection unit
6. First variation
7. Second variation
8. Second variation—first method, second method

FIRST EMBODIMENT

1. System

FIG. 1 shows a mobile communication system according to an embodiment of the present invention. As shown in FIG. 1, the mobile communication system includes a cell 50, user devices 100₁, 100₂, and 100₃ (may be collectively called the user device 100) in the cell 50, a base station 200, an access gateway 300, and a core network 400. In this embodiment, it is assumed that one or more of the user devices 100₁, 100₂, and 100₃ perform radio communications with the base station 200 according to a MIMO scheme. The user device 100 is typically a mobile station, but may instead be implemented as a fixed station. It is also assumed that the mobile communication system employs SC-FDMA (or DFT-spread OFDM) for uplink. Alternatively, the mobile communication system may employ SC-FDMA for downlink.

2. Transmitting Device

Figure 2:
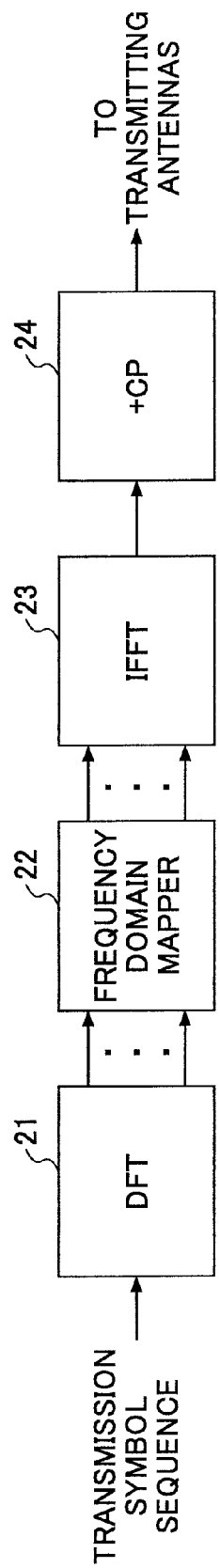
FIG. 2 is a partial block diagram of a transmitting device.

FIG. 2 shows a transmitting device for the mobile communication system of this embodiment. In this embodiment, it is assumed that the transmitting device is included in the user device 100. Alternatively, the transmitting device may be included in the base station 200. As shown in FIG. 2, the transmitting device includes a discrete Fourier transform unit (DFT) 21, a frequency domain mapper 22, an inverse fast Fourier transform unit (IFFT) 23, and a guard interval adding unit (+CP) 24.

The discrete Fourier transform unit (DFT) 21 receives a symbol sequence to be transmitted and discrete-Fourier-transforms a predetermined number of symbols at once. The symbol sequence is typically, but is not limited to, a series of error-correction-coded and data-modulated symbols. The discrete Fourier transform unit (DFT) 21 discrete-Fourier-transforms a predetermined number ($N_{DFT}$) of symbols at once, and thereby transforms the symbol sequence in the time domain into a signal in the frequency domain. Here, $N_{DFT}$ indicates a window size or a block size for discrete Fourier transformation.

Figure 3:
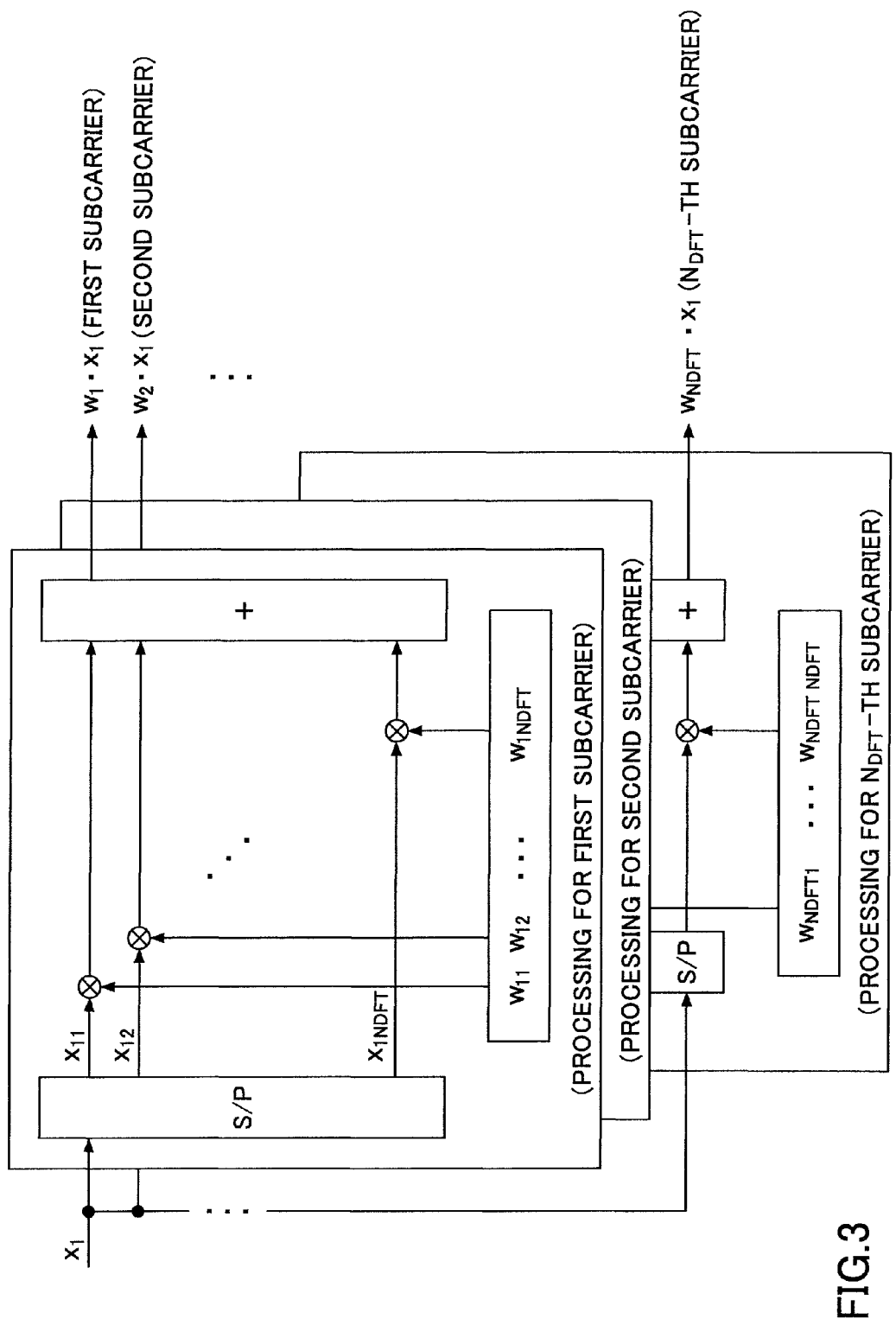
FIG. 3 is a drawing illustrating calculations performed by a DFT 21.

FIG. 3 is a drawing illustrating calculations performed by the DFT 21. In FIG. 3, $x_1$ at the left end indicates a signal (symbol sequence) to be transmitted from a first transmitting antenna of $N_{TX}$ transmitting antennas. Signals $x_2$, $x_3$, ..., $x_{XNTX}$ to be transmitted from second, third, ..., $N_{TX}$ transmitting antennas are omitted in FIG. 3 for brevity. Here, the symbol sequence $x_1$ indicates $N_{DFT}$ symbols collectively. For example, the symbol sequence $x_1$ includes $N_{DFT}$ symbols associated with a point on a symbol constellation. Discrete Fourier transformation is equivalent to weighted addition of the $N_{DFT}$ symbols. As shown in FIG. 3, the symbol sequence $x_1$ including the $N_{DFT}$ symbols (=$x_{11}$, $x_{12}$, ..., $x_{1NDFT}$) is converted by a serial-parallel converter (S/P), each of the $N_{DFT}$ symbols is multiplied by a predetermined weight $w_{1j}$, and the multiplied symbols are added together to obtain a first subcarrier signal $w_1 \cdot x_1$. Similarly, a second subcarrier signal $w_2 \cdot x_1$ and subsequent subcarrier signals to be mapped to the corresponding subcarriers are obtained. Through the above calculations, $N_{DFT}$ subcarrier components for all subcarriers to be transmitted at once from the first transmitting antenna are prepared. Similar calculations are also performed for signals $x_2$ through $X_{NTX}$ to be transmitted from other transmitting antennas.

The frequency domain mapper 22 shown in FIG. 2 maps the discrete-Fourier-transformed symbols to the corresponding subcarriers. For example, when frequency scheduling is performed for uplink, the frequency domain mapper 22 maps the symbols to available resource units. The available resource units are specified, for example, by scheduling information included in control information received by the transmitting device. Any appropriate method may be used for mapping the symbols to subcarriers. The simplest way may be to map the discrete-Fourier-transformed $N_{DFT}$ symbols to $N_{DFT}$ subcarriers from lower to higher frequencies.

The inverse fast Fourier transform unit (IFFT) 23 inverse-fast-Fourier-transforms the symbols mapped to the subcarriers to transform the signal in the frequency domain into a signal (transmission symbols) in the time domain.

The guard interval adding unit (+CP) 24 attaches guard intervals to the transmission symbols and outputs the transmission symbols with the guard intervals to a transmission signal generating unit (not shown) that follows. The guard intervals may be generated by a cyclic prefix (CP) scheme.

3. Receiving Device

Figure 4:
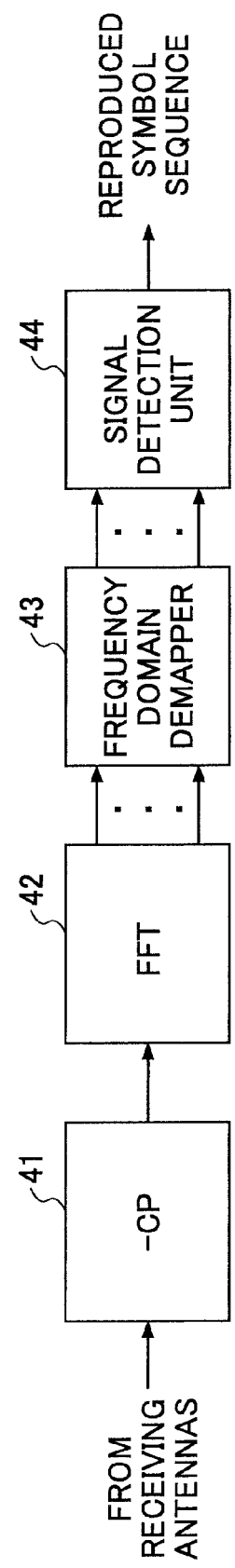
FIG. 4 is a partial block diagram of a receiving device.

FIG. 4 shows a receiving device for the mobile communication system of this embodiment. As shown in FIG. 4, the receiving device includes a guard interval removing unit (−CP) 41, a fast Fourier transform unit (FFT) 42, a frequency domain demapper 43, and a signal detection unit 44.

The guard interval removing unit (−CP) 41 removes guard intervals from a received baseband signal.

The fast Fourier transform unit (FFT) 42 fast-Fourier-transforms the received signal and thereby transforms the received signal in the time domain into a signal in the frequency domain.

The frequency domain demapper 43 performs a process, which is complementary to the process of the frequency domain mapper 22 of the transmitting device, on the signal in the frequency domain and thereby extracts signal components mapped to subcarriers.

The signal detection unit 44 narrows down candidates of transmission symbols based on the signal components mapped to the subcarriers and identifies the transmission symbols.

4. Operations

Operations of the signal detection unit 44 are described below. In the descriptions below, it is assumed that a transmission symbol sequence to be input to the DFT 21 and transmitted from an n-th transmitting antenna of the transmitting device of FIG. 2 is indicated by $x_n$. The transmission symbol sequence $x_n$ includes $N_{DFT}$ symbols. $N_{DFT}$ indicates a window size (or a block size) for discrete Fourier transformation.

$$x_n = [x_{n1} x_{n2} \ldots x_{nNDFT}]^T$$

In this formula, T indicates transposition, n indicates a natural number less than or equal to $N_{TX}$, and $N_{TX}$ indicates the total number of transmitting antennas.

Weighting factors $w_i$ to be used for an i-th subcarrier (i indicates a natural number less than or equal to $N_{DFT}$) are represented by the following formula:

$$w_i = [w_{i1} w_{i2} \ldots w_{iNDFT}]^T$$

All signals received at a time via $N_{RX}$ receiving antennas of the receiving device of FIG. 3 are indicated by the following formula:

$$Y = [y_1 y_2 \ldots y_{NDFT}]^T$$

In this formula, $y_i$ indicates signals of an i-th subcarrier received by the respective $N_{RX}$ receiving antennas and is represented as follows:

$$y_i = [y_{i1} y_{i2} \ldots y_{iNRX}]^T$$

Also, the received signals $y_i$ of the i-th subcarrier may be represented by the following formula:

$$y_i = \begin{bmatrix} y_{i1} \\ y_{i2} \\ \vdots \\ y_{iN_{RX}} \end{bmatrix} = H_i \times \begin{bmatrix} w_i & 0_{NDFT} & 0_{NDFT} \\ 0_{NDFT} & w_i & 0_{NDFT} \\ \vdots & & \ddots & \vdots \\ 0_{NDFT} & \cdots & & w_i \end{bmatrix} \times \begin{bmatrix} x_1 \\ x_2 \\ \vdots \\ x_{NTX} \end{bmatrix} + N_i$$

(with $(N_{DFT} \times N_{TX})$ COLUMNS and $N_{TX}$ ROWS)

In the above formula, $H_i$ indicates a channel matrix indicating radio channel conditions regarding the i-th subcarrier. The channel matrix $H_i$ may be represented by the following formula:

$$H_i = \begin{bmatrix} h_{i,11} & h_{i,12} & \cdots & h_{i,1N_{TX}} \\ h_{i,21} & h_{i,22} & \cdots & h_{i,2N_{TX}} \\ \vdots & \vdots & & \\ h_{i,N_{RX}1} & h_{i,N_{RX}2} & \cdots & h_{i,N_{RX}N_{TX}} \end{bmatrix}$$

($N_{TX}$ COLUMNS, $N_{RX}$ ROWS)

The channel matrix $H_i$ has dimensions of $N_{Rx}$ rows and $N_{TX}$ columns. $N_{Rx}$ indicates the total number of receiving antennas and $N_{TX}$ indicates the total number of transmitting antennas. A matrix element $h_{i,pq}$ of the channel matrix $H_i$ indicates one of channel conditions (transfer functions), which corresponds to the i-th subcarrier, between a p-th receiving antenna and a q-th transmitting antenna. Matrix elements of the channel matrix $H_i$ may be obtained, for example, based on reception conditions of a pilot signal.

Also in the above formula, $w_i$ is a vector representing the weighting factors described above, and $0_{NDFT}$ is a 0 vector having $N_{DFT}$ elements.

Also, $x_n$ indicates a signal transmitted from an n-th transmitting antenna.

Further, $N_i$ indicates a noise component regarding the i-th subcarrier.

All sets of $N_{DFT}$ subcarrier components received by the $N_{Rx}$ receiving antennas are represented by the following formula:

$$\underbrace{\begin{bmatrix} y_1 \\ y_2 \\ \vdots \\ y_{NDFT} \end{bmatrix}}_{Y} = \underbrace{\begin{bmatrix} H_i & 0 & & 0 \\ 0 & H_2 & & 0 \\ \vdots & \vdots & \ddots & \vdots \\ 0 & 0 & \cdots & H_{NDFT} \end{bmatrix}}_{H} \times \underbrace{\begin{bmatrix} w_1 \\ w_2 \\ \vdots \\ w_{NDFT} \end{bmatrix}}_{W} \times \underbrace{\begin{bmatrix} x_1 \\ x_2 \\ \vdots \\ x_{NTX} \end{bmatrix}}_{x} + \underbrace{\begin{bmatrix} N_1 \\ N_2 \\ \vdots \\ N_{DFT} \end{bmatrix}}_{N}$$

($(N_{DFT} \times N_{TX})$ COLUMNS, $(N_{DFT} \times N_{TX})$ ROWS, F)

$$Y = H \times W \times x + N \quad (1)$$

Signals represented by formula (1) are input to the signal detection unit 44 of FIG. 4.

First, a unitary matrix Q and an upper triangular matrix R are obtained such that the product of a channel matrix H and a weight matrix W is expressed by the product of the unitary matrix Q and the upper triangular matrix R (HW=QR).

$$H \times W = Q \times R \quad (2)$$

The upper triangular matrix R is a square matrix of M rows and M columns (M=$N_{DFT} \times N_{TX}$) where matrix elements $r_{ij}$ (i>j) are all zero.

$$R = \begin{bmatrix} r_{11} & r_{12} & \cdots & r_{1M} \\ 0 & r_{22} & \cdots & r_{2M} \\ \vdots & \vdots & \ddots & \vdots \\ 0 & 0 & \cdots & r_{MM} \end{bmatrix} \quad (M = N_{DFT} \times N_{TX})$$

In the present application, when a matrix A is a unitary matrix, the matrix A satisfies $A^H A = A A^H = 1$. Accordingly, the matrix A is not necessarily a square matrix. Also in the present application, a normal "H" indicates a channel matrix and a superscript "H" indicates conjugate transposition.

When both sides of formula (1) are multiplied by $Q^H$ from the left, the left-hand side can be expressed as follows:

$$z = Q^H Y$$

Meanwhile, the right-hand side can be expressed as follows:

$$Q^H \times (H \times w \times x + N) = Q^H \times (Q \times R \times x + N) = R \times x + Q^H N \quad (3)$$

Therefore, when the noise is ignored, the unitary-transformed received signals z can be represented by R×x.

$$z = R \times x \quad (4)$$

Since R is an upper triangular matrix, an M-th signal component ($M = N_{DFT} \times N_{TX}$) can be expressed as follows:

$$z_M = r_{MM} \times x_M \quad (5)$$

This indicates that the M-th signal component $x_M$ can be fairly easily estimated without taking into account the interference of signals of other subcarriers and/or other transmitting antennas.

In a first stage of a transmission symbol estimation process, candidates of transmission symbols of the signal component $x_M$ are narrowed down based on formula (5). Here, the signal component $x_M$ corresponds to a signal point on the symbol constellation. For example, there are four possibilities (or candidates) when QPSK is used, or there are 64 possibilities (or candidates) when 64 QAM is used. For each of all possible candidates, the square Euclidean distance between the unitary-transformed received signal $z_M$ and $r_{MM} \times$(candidate of $x_M = s_M(x)$) is calculated as a survival metric.

$$e1(x) = |z_M - r_{MM} \times s_M(x)|^2 \quad (6)$$

Of the survival metrics obtained, the smallest S1 (S1≦C) candidates are selected and other candidates are discarded. Here, C indicates the total number of signal points (total number of possible candidates) in the symbol constellation.

In a second stage of the transmission symbol estimation process, the following formula obtained from formula (4) is used:

$$z_{M-1} = r_{M-1M-1} \times x_{M-1} + r_{M-1M} \times x_M \quad (7)$$

The S1 candidates obtained in the first stage are substituted for $x_M$. There are also C candidates in total for $x_{M-1}$. Therefore, survival metrics are calculated as in the first stage for all combinations (S1×C) of $x_M$ and $x_{M-1}$.

$$e2(s_M(x), s_{M-1}(x)) = |z_{M-1} - (r_{M-1M-1} \times s_{M-1}(x) + r_{M-1M} \times s_M(x))|^2 + e1(x) \quad (8)$$

The second term in the right-hand side of (8) indicates the survival metrics obtained in the first stage. Of the survival metrics $e2(s_M(x), s_{M-1}(x))$, the smallest S2 (S2≦S1C) candidates are selected and other candidates are discarded.

Similar steps are repeated and the number of survival metrics is increased stage by stage. Then, in the last stage, a combination of transmission symbols corresponding to the smallest metric is estimated as the actually transmitted symbols.

5. Details of Signal Detection Unit

Figure 5:
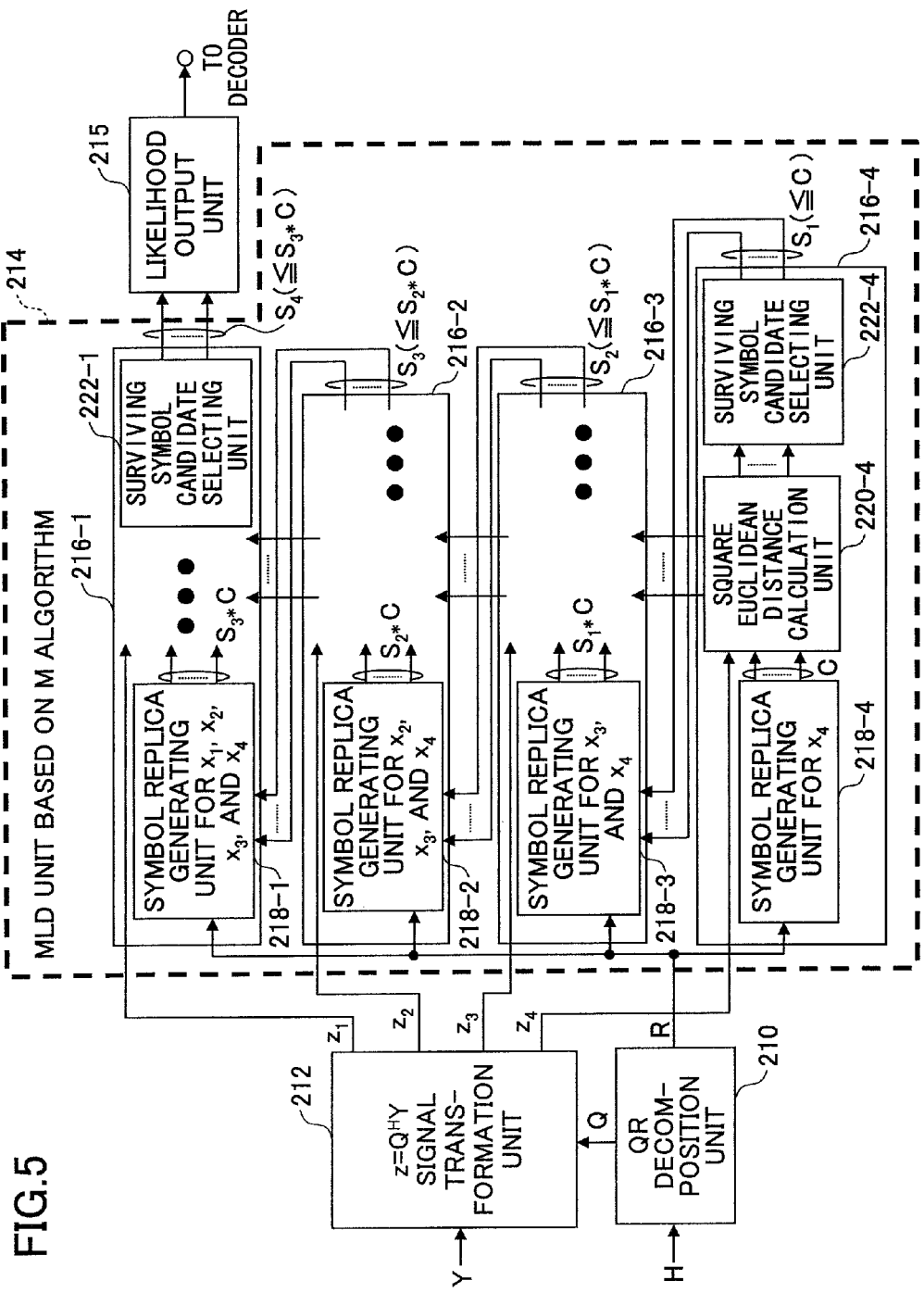
FIG. 5 is a drawing illustrating an exemplary configuration of a signal detection unit.

FIG. 5 shows details of the signal detection unit 44 of FIG. 4 which mainly performs the process as described in <4. OPERATIONS>. The signal detection unit 44 includes a QR decomposition unit 210, a signal transformation unit 212, a maximum likelihood detection (MLD) unit 214, and a likelihood output unit 215. The maximum likelihood detection unit 214 includes four determining units 216-1, 216-2, 216-3, and 216-4. For brevity, only four determining units are shown in FIG. 5. However, any number of determining units may be provided depending on the number of transmission signals. The determining units 216-1, 216-2, 216-3, and 216-4 include substantially the same processing blocks, and therefore the determining unit 216-4 is taken as an example for the descriptions below. The determining unit 216-4 includes a symbol replica generating unit 218-4, a square Euclidean distance calculation unit 220-4, and a surviving symbol candidate selecting unit 222-4.

Each processing element in FIG. 5 and other figures may be implemented by hardware, software, or a combination of them.

The QR decomposition unit 210 obtains a unitary matrix Q and an upper triangular matrix R such that the product of a channel matrix H and a weight matrix W is expressed by the product of the unitary matrix Q and the upper triangular matrix R (HW=QR).

The signal transformation unit 212 multiplies a vector Y including multiple received signals as elements by a conjugate transposed matrix $Q^H$ of the unitary matrix Q to transform the received signals. When the noise is ignored, the unitary-transformed received signals can be expressed by the product of the upper triangular matrix R and a transmission symbol sequence x.

$$z = Rx$$

The maximum likelihood detection unit 214 narrows down symbol candidates of transmission signals by a maximum likelihood detection (MLD) method. The symbol replica generating unit 218-4 of the determining unit 216-4 generates symbol candidates of a transmission signal corresponding to a received signal $x_4$ by using matrix elements of the upper triangular matrix R. The number of symbol candidates is represented by C.

The square Euclidean distance calculation unit 220-4 calculates square Euclidean distances between a unitary-transformed received signal $z_i$ and C symbol candidates. The square Euclidean distances represent survival metrics used for calculations of likelihood.

The surviving symbol candidate selecting unit 222-4 selects S1 (≦C) symbol candidates based on the square Euclidean distances and outputs the selected symbol candidates as surviving symbol candidates.

The likelihood output unit 215 calculates the likelihood of symbol candidates output from the surviving symbol candidate selecting unit of the last stage. For example, the likelihood is represented by a log likelihood ratio (LLR). An output from the likelihood output unit 215 indicates signal separation results and is sent to a demodulation unit (e.g., turbo decoder) that follows.

6. First Variation

In the above embodiment, F=H×W is QR-decomposed. However, the present invention is not limited to the above embodiment. For example, a matrix G as shown by the following formula may be QR-decomposed:

$$G = \begin{bmatrix} F \\ \sqrt{N_0} I \end{bmatrix}$$

In the above formula, $N_0$ indicates average noise power measured at the receiving device, and I indicates a unit matrix of $N_{TX}$ rows and $N_{TX}$ columns. In this case, the unitary matrix Q has dimensions of $N_{DFT}(N_{TX}+N_{RX})$ rows and $(N_{DFT} \times N_{TX})$ columns. The upper triangular matrix R is a square matrix of $(N_{DFT} \times N_{TX})$ rows and $(N_{DFT} \times N_{TX})$ columns, i.e., has the same dimensions as in the above embodiment.

In the above embodiment, the received signals Y are represented by a vector of $(N_{DFT} \times N_{RX})$ rows and one column. Meanwhile, in this variation, the received signals Y' are represented by a vector of $(N_{DFT} \times (N_{TX}+N_{RX}))$ rows and one column where $N_{DFT} \cdot N_{TX}$ components are zeros.

$$Y' = \begin{bmatrix} y_1 \\ y_2 \\ \vdots \\ y_{N_{DFT}} \\ 0 \\ \vdots \\ 0 \end{bmatrix} \begin{matrix} \} N_{DFT} \times N_{RX} \\ \\ \} N_{DFT} \times N_{TX} \end{matrix}$$

Using the modified received signal vector Y' and the matrix G is preferable when performing MMSE QR decomposition or ZF QR decomposition.

7. Second Variation

As described in <4. OPERATIONS>, when symbols are transmitted using $N_{DFT}$ subcarriers from $N_{TX}$ transmitting antennas, the received signals Y are expressed as follows without considering the noise:

$$Y = H \times W \times x = F \times x \qquad (9)$$

In formula (9), H indicates a channel matrix, W indicates a weight matrix representing weighting in the frequency direction performed by the DFT 21, F indicates the matrix product of the channel matrix H and the weight matrix W, and x indicates transmission symbols. In the above descriptions of operations, the matrix product F is QR-decomposed and transmission symbols are estimated sequentially according to the M algorithm. The number of stages of the M algorithm is $N_{TX} \times N_{DFT}$. The received signals Y are multiplied by the unitary matrix $Q^H$, and symbols are estimated sequentially from the lowest symbol.

$$Q^H Y = Q^H \times (H \times w \times x) = Q^H \times (Q \times R \times x) = R \times x \qquad (10)$$

In formula (10), R indicates an upper triangular matrix having $N_{DFT} \times N_{TX}$ rows and $N_{DFT} \times N_{TX}$ columns.

Meanwhile, the product of a matrix A and a column vector s equals the product of a matrix A' obtained by permuting the columns in the matrix A and a column vector s' obtained by permuting elements of the column vector s in a corresponding manner.

$$A \times s = A' \times s'$$

For example, when the matrix A has two rows and two columns and the column vector s has two rows and one column ($s=(s1 s2)^T$), the following formula is true:

$$As = \begin{bmatrix} a & b \\ c & d \end{bmatrix} \begin{bmatrix} s_1 \\ s_2 \end{bmatrix} =$$

$$\begin{bmatrix} as_1 + bs_2 \\ cs_1 + ds_2 \end{bmatrix} = \begin{bmatrix} bs_2 + as_1 \\ ds_2 + cs_1 \end{bmatrix} = \begin{bmatrix} b & a \\ d & c \end{bmatrix} \begin{bmatrix} s_2 \\ s_1 \end{bmatrix} = A's'$$

This relationship also holds for higher-dimensional matrices. Permutation of the columns in the matrix may be performed in any manner as long as the elements of the column vector are permuted in the corresponding manner. In the second variation, the above described QR decomposition is performed based on this characteristic.

$$Y = H \times W \times x = F \times x = F' \times x' \qquad (9)$$

The matrix F' is obtained by permuting columns in the matrix F ($=H \times W$) with a given method. The column vector x' is obtained by permuting elements of the column vector x with a method corresponding to the permutation method for the matrix F.

In stages of the M algorithm, selection of symbol replica candidates is performed for symbols in ascending order of their positions in a transmission symbol vector. The order of estimating symbols greatly affects the accuracy of selecting surviving symbol replica candidates. In the second variation, the columns of the matrix F are permuted to improve the accuracy of selecting surviving symbol replica candidates and thereby to improve the symbol estimation accuracy.

Rows and columns of a matrix are relative concepts. Therefore, when transmission symbols are defined by a row vector, rows in the matrix F may be permuted. In other words, although transmission symbols are defined by a column vector in the above examples, the generality of the present invention is not lost.

Figure 6:
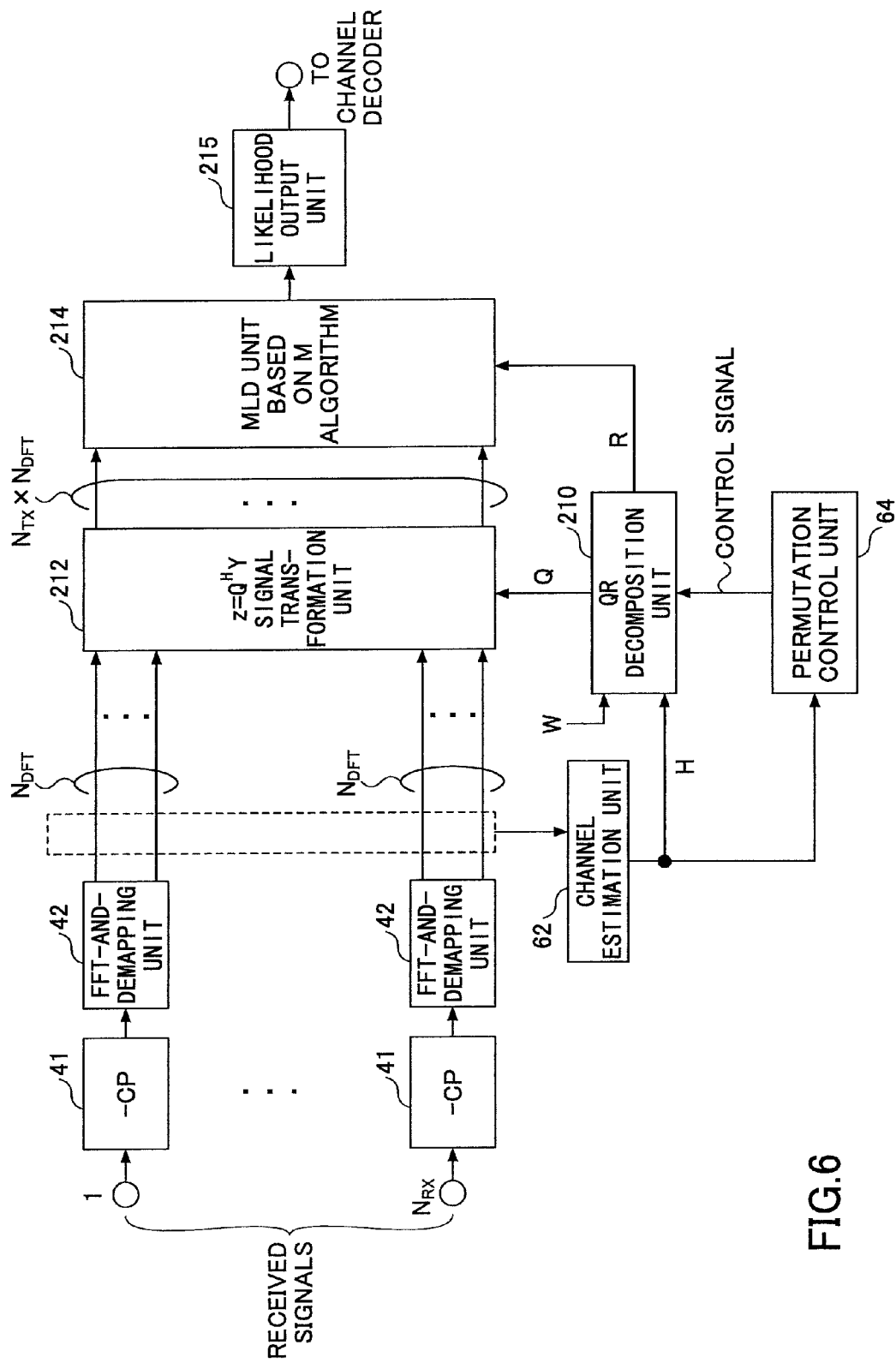
FIG. 6 is a functional block diagram illustrating details of a receiving device.

FIG. 6 shows details of the receiving device of FIG. 4. As shown in FIG. 6, the receiving device includes the guard interval removing unit(s) (−CP) 41, the fast Fourier transform unit(s) (FFT-and-demapping unit(s)) 42, the QR decomposition unit 210, the signal transformation unit 212, the MLD unit 214, the likelihood output unit 215, a channel estimation unit 62, and a permutation control unit 64.

The guard interval removing unit (−CP) 41 removes guard intervals from a received baseband signal.

The fast Fourier transform unit (FFT-and-demapping unit) 42 fast-Fourier-transforms the received signal and thereby transforms the received signal in the time domain into a signal in the frequency domain. Here, for descriptive purposes, it is assumed that the fast Fourier transform unit (FFT-and-demapping unit) 42 performs both fast Fourier transformation and demapping. Alternatively, an FFT unit and a demapping unit may be provided separately.

The channel estimation unit 62 estimates radio channel conditions of respective subcarriers and obtains a channel matrix H for each of the subcarriers. Accordingly, channel matrices H of all subcarriers form a matrix of $N_{RX} \times N_{DFT}$ rows and $N_{TX} \times N_{DFT}$ columns. Matrix elements of the channel matrix H may be obtained, for example, based on reception conditions of a pilot signal.

The QR decomposition unit 210 obtains a unitary matrix Q and an upper triangular matrix R based on the channel matrix H, the weight matrix W, and a control signal from the permutation control unit 64. More particularly, the QR decomposition unit 210 obtains a matrix F' by permuting columns of the matrix product F of the channel matrix H and the weight matrix W according to the control signal. Then, the QR decomposition unit 210 obtains a unitary matrix Q and an upper triangular matrix R such that the matrix F' is expressed by the product of the unitary matrix Q and the upper triangular matrix R (F'=QR).

The signal transformation unit 212 multiplies a vector Y including multiple received signals as elements by a conjugate transposed matrix $Q^H$ of the unitary matrix Q to transform the received signals. When the noise is ignored, the unitary-transformed received signals can be expressed by the product of the upper triangular matrix R and a transmission symbol sequence x.

$$z = Q^H Y = Rx$$

The MLD unit 214 narrows down symbol candidates of transmission signals by a maximum likelihood detection (MLD) method. The MLD unit 214 calculates branch metrics for the received signals multiplied by the unitary matrix $Q^H$ ($Q^H Y$ (=Rx)) sequentially from lower symbols. The branch metrics are represented by square Euclidean distances between the received signals and the symbol candidates. The MLD unit 214 selects, as surviving candidates, a predetermined number (M) of symbol candidates in ascending order of cumulative branch metrics, and goes onto the next stage. In each of $N_{TX} \times N_{DFT}$ stages, the MLD unit 214 calculates branch metrics and selects surviving candidates.

The likelihood output unit 215 calculates the likelihood of symbol candidates output from the surviving symbol candidate selecting unit of the last stage. For example, the likelihood is represented by a log likelihood ratio (LLR). An output from the likelihood output unit 215 indicates signal separation results and is sent to a demodulation unit that follows.

The permutation control unit 64 inputs a control signal to the QR decomposition unit 210. The control signal indicates a method of permuting columns of the matrix product F of the channel matrix H and the weight matrix W. Formula (9) described above holds regardless of the method of permutation. No single permutation method applies to all cases. Therefore, an appropriate permutation method is determined based on a certain criterion. As described later, the columns of the matrix product F may be permuted based on received power (at the receiving device) of the transmission symbols (first method) and/or based on subcarriers (second method).

8. Second Variation—First Method

A first method (permutation according to transmitting antennas) of the second variation is described below. In the first method, the columns of the matrix product F is permuted based on received power of transmission symbols at the receiving device. In a k-th stage ($1 \leq k \leq N_{TX} N_{SF}$) in a symbol estimation process according to the M algorithm, symbols estimated in first through (k−1)th stages and a k-th row of the upper triangular matrix R are used. This indicates that selection of surviving symbol replica candidates for the first through k-th transmission symbols is performed based on the sum of squares (signal power) of elements from the ($N_{TX} N_{SF}$−k+1)th row to the $N_{TX} N_{SF}$-th row of the ($N_{TX} N_{SF}$−k+1) th column in the matrix R. Therefore, in the earlier stages (particularly in the first stage), the estimation process is easier, but the probability of selecting wrong symbol replica candidates is also high. In the first method, the received signal power levels of transmission symbols from the respective transmitting antennas are measured and higher priorities are given to transmission symbols with higher received signal power levels. This is because the probability of selecting wrong symbol replica candidates decreases as the received power increases. The orders of the columns of the matrix product F and the (subcarrier) components of the transmission symbol sequence x are determined such that the above priorities are achieved.

In a DFT-MIMO multiplexing scheme employing frequency domain spreading of this method, the number of code-division-multiplexed transmission symbol sequences corresponds to the number of transmitting antennas. The components of a transmission symbol sequence transmitted from one transmitting antenna show the same received signal power. In this method, a transmitting antenna providing higher received power is identified, and symbols transmitted from the identified transmitting antenna are preferentially estimated prior to symbols from other transmitting antennas. Any appropriate method may be used to measure received power levels of symbols from respective transmitting antennas. For example, matrix elements of a channel matrix may be used for this purpose. As described above, the channel matrix $H_i$ for the i-th subcarrier has dimensions of $N_{RX}$ rows and $N_{TX}$ columns. $N_{RX}$ indicates the total number of receiving antennas and $N_{TX}$ indicates the total number of transmitting antennas. A matrix element $h_{i,pq}$ of the channel matrix $H_i$ indicates one of channel conditions (transfer functions), which corresponds to the i-th subcarrier, between the p-th receiving antenna and the q-th transmitting antenna. Therefore, the sum of $|h_{i,pq}|^2$ of all receiving antennas (p=1−$N_{RX}$) can be used to estimate the received power of a symbol from the q-th transmitting antenna. Let us assume that $N_{TX}=N_{RX}=2$ and $N_{DFT}=3$. In this case, the following formulas are true for the i-th subcarriers (i=1, 2, 3):

$$r_{i1} = h_{i,11} x_1 + h_{i,12} x_2$$

$$r_{i2} = h_{i,21} x_1 + h_{i,22} x_2$$

The received power of symbols from the first transmitting antenna can be evaluated by the following formula:

$$P_{Tx1} = |h_{i,11}|^2 + |h_{i,21}|^2$$

Similarly, the received power of symbols from the second transmitting antenna can be evaluated by the following formula:

$$P_{Tx2} = |h_{i,12}|^2 + |h_{i,22}|^2$$

Here, let us assume that the received power of the symbols from the first transmitting antenna is greater than the received power of the symbols from the second transmitting antenna ($P_{Tx1} > P_{Tx2}$). According to the first method, sybols $x_1 = (x_{11} x_{12} x_{13})^T$ from the first transmitting antenna need to be estimated in preference to symbols $x_2 = (x_{21} x_{22} x_{23})^T$ from the second transmitting antenna. For this purpose, the columns of the matrix product F' and the components of the transmission symbol sequence x are permuted. For example, a transmission symbol sequence x' after permutation is represented by the following formula:

$$x' = (x_{21} x_{22} x_{23} x_{11} x_{12} x_{13})^T$$

As shown by the above formula, the components of the transmission symbol sequence $x_1$ are moved to lower positions in the column vector to give priority to symbols from the first transmitting antenna. At this stage, the order in which the subcarrier components $x_{11}$, $x_{12}$, and $x_{13}$ in the transmission symbol sequence $x_1$ are estimated is not uniquely determined yet. For example, the subcarrier components $x_{11}$, $x_{12}$, and $x_{13}$ may be estimated in ascending order of subcarrier numbers. In this case, the transmission symbol sequence x' after permutation is represented by the following formula:

$$x' = (x_{23} x_{22} x_{21} x_{13} x_{12} x_{11})^T$$

The subcarrier components may also be permuted in any other order.

In the above descriptions, the numbers of antennas and the number of subcarriers are just examples, and any other values may be used.

8. Second Variation—Second Method

A second method of the second variation (permutation according to subcarriers) is described below. When selecting surviving symbol replica candidates using the M algorithm, a combination of symbols with high fading correlation tend to cause a serious error. High fading correlation between symbols indicates that the symbols are subject to a similar level of fading. Low fading correlation between symbols indicates that the symbols are subject to different levels of fading. For example, the fading correlation is represented by a value greater than or equal to 0 and less than or equal to 1. The fading correlation increases as the value nears 1 and decreases as the value nears 0.

Figure 7:
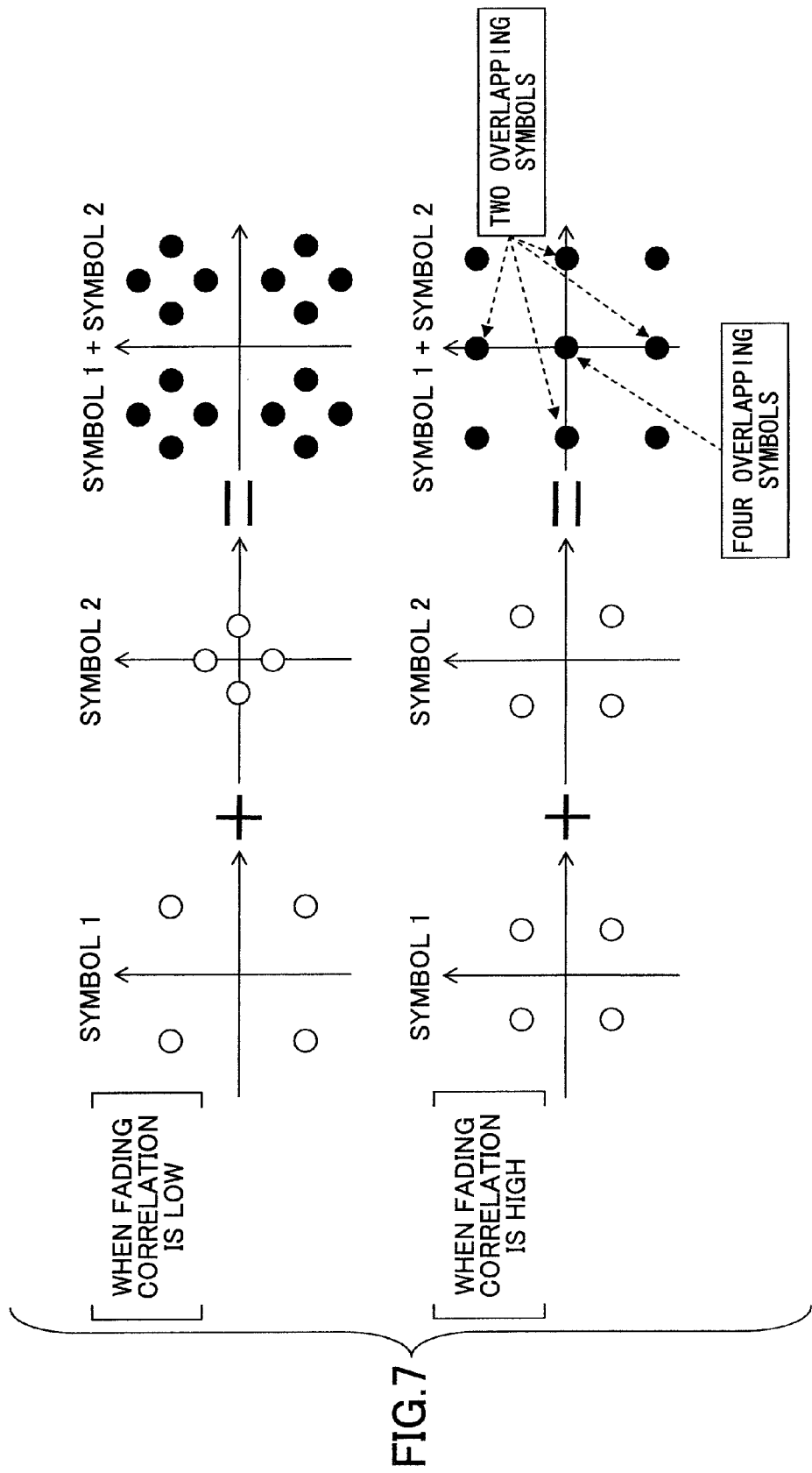
FIG. 7 is a drawing used to describe that the level of difficulty in determining a combination of symbols varies depending on the degree of fading correlation.

FIG. 7 is a drawing used to describe that the level of difficulty in determining a combination of symbols varies depending on the degree of fading correlation. Here, it is assumed that the number of transmitting antennas $N_{TX}$ and the number of receiving antennas $N_{RX}$ are both 2. A symbol 1 ($x_1$) is transmitted from a first transmitting antenna. A symbol 2 ($x_2$) is transmitted from a second transmitting antenna. It is assumed that the symbols transmitted from the transmitting antennas are data modulated by QPSK. In this case, each symbol is one of four signal points on a signal constellation. In other words, there are four candidates for each of the symbols 1 and 2. Therefore, the number of combinations is 16. The symbols 1 and 2 are received at the receiving device as a combined signal ($r_{i1}$, $r_{i2}$). As described above, the transmission signals and the received signals satisfy relationships represented by the following formulas:

$$r_{i1} = h_{i,11} x_1 + h_{i,12} x_2$$

$$r_{i2} = h_{i,21} x_1 + h_{i,22} x_2$$

When the fading correlation is low, the symbols are subject to different levels of fading. In this case, as shown in upper right of FIG. 7, 16 combinations of symbols for the combined received signal are all distinguishable. Therefore, the accuracy in selecting a combination of symbols is high. Meanwhile, when the fading correlation is high, the symbols are subject to a similar level of fading. In the lower part of FIG. 7, it is assumed that the symbols 1 and 2 are subject to the same level of fading. In this case, as shown in lower right of FIG. 7, 16 combinations of symbols for the combined received signal are only partially distinguishable. In this example, only nine combinations are distinguishable due to overlapping of symbols. The likelihood of overlapping symbols indicated by "two overlapping symbols" and "four overlapping symbols" in FIG. 7 cannot be determined by just comparing their square Euclidean distances or phases.

In a DFT-MIMO multiplexing scheme employing frequency domain spreading, code-division-multiplexed symbols transmitted from the same antenna tend to undergo a similar level of fading (the fading correlation tends to become high).

In the second method, for the above reasons, permutation is performed such that symbols subject to a similar level of fading are not estimated consecutively. In other words, the order of symbol detection is determined such that after a first symbol is estimated, a second symbol subject to a different level of fading from that of the first symbol is estimated. More specifically, the order of symbol detection is controlled such that a transmission symbol from a first transmitting antenna is estimated and then a transmission symbol from a second transmitting antenna is estimated.

The degree of fading correlation may be determined by any appropriate method. For example, the degree of fading correlation may be determined based on the similarity of amplitudes and phases of matrix elements $h_{i,pq}$ of the channel matrix. Taking the i-th subcarrier as an example, when pilot signals with a size 1 are transmitted, respectively, from an a-th transmitting antenna and a b-th transmitting antenna and received by a p-th receiving antenna, the fading correlation between the two received signals may be evaluated by $h_{i,pa} * h_{i,pb}$ (where * indicates complex conjugate). Needless to say, any other appropriate method may be used to determine the degree of fading correlation.

With the order of symbol detection determined based on the fading correlation, symbols from transmitting antennas may be estimated subcarrier by subcarrier. As described above, signals transmitted from the same antenna are subject to a similar level of fading and therefore have high fading correlation. Meanwhile, signals transmitted from different antennas are subject to different levels of fading and therefore have low fading correlation. For these reasons, for example, after $N_{TX}$ transmission symbols (subcarrier components) transmitted using the i-th subcarrier are estimated, next $N_{TX}$ transmission symbols transmitted using the i+1-th subcarrier are estimated. Similar steps are repeated, and symbols with low fading correlation are estimated successively. For example, subcarriers are selected sequentially in ascending order of subcarrier numbers and for each selected subcarrier, symbols transmitted from all transmitting antennas are estimated.

Let us assume that $N_{TX}=N_{RX}=2$ and $N_{DFT}=3$. In this case, the transmission symbol sequence x' after permutation is represented by the following formula:

$$x' = (x_{23} x_{13} x_{22} x_{12} x_{21} x_{11})^T$$

In the above formula, subcarrier components are estimated in ascending order of subcarrier numbers. The order of estimating subcarrier components is not limited to the ascending order of subcarrier numbers. For example, the subcarrier components may be estimated in descending order of their received power levels. Let us assume that the received power of the second subcarrier component is higher than the third subcarrier component, and the received power of the third subcarrier component is higher than the first subcarrier component. As described in the first method of the second variation, it is preferable to arrange the subcarrier components in descending order of the received power to improve estimation accuracy. Therefore, the transmission symbol sequence x' after permutation is expressed as follows:

$$x' = (x_{21} x_{11} x_{23} x_{13} x_{22} X_{12})^T$$

In the above descriptions, the numbers of antennas and the number of subcarriers are just examples, and any other values may be used.

The present invention is not limited to the specifically disclosed embodiments, and variations and modifications may be made without departing from the scope of the present invention. Although specific values are used in the above descriptions to facilitate the understanding of the present invention, the values are just examples and different values may also be used unless otherwise mentioned. Although specific formulas are used in the above descriptions to facilitate the understanding of the present invention, the formulas are just examples and different formulas may also be used unless otherwise mentioned. The distinctions between the embodiments are not essential for the present invention, and the embodiments may be used individually or in combination. Also, subject matter described in one embodiment may be applied to the subject matter in another embodiment unless they are contradictory. Although functional block diagrams are used to describe apparatuses in the above embodiments, the apparatuses may be implemented by hardware, software, or a combination of them.

The present international application claims priority from Japanese Patent Application No. 2008-24355 filed on Feb. 4, 2008, the entire contents of which are hereby incorporated herein by reference.

The present international application claims priority from Japanese Patent Application No. 2008-315035 filed on Dec. 10, 2008, the entire contents of which are hereby incorporated herein by reference.

The invention claimed is:

1. A receiving device for a mobile communication system employing a single-carrier multiple-input multiple-output (MIMO) transmission scheme where Fourier-transformed and weighted symbols in a transmission symbol sequence are mapped to subcarriers, inverse-Fourier-transformed, and then transmitted from multiple transmitting antennas, the receiving device comprising:
an extracting unit configured to Fourier-transform signals received by multiple receiving antennas and to extract signal components mapped to the subcarriers from the signals; and
a signal detection unit configured to estimate the symbols transmitted via the subcarriers by applying a QR decomposition algorithm to the extracted signal components,
wherein the signal detection unit includes
a decomposition unit configured to obtain a unitary matrix such that a product of the unitary matrix and a triangular matrix equals a product of a weight matrix determining a correspondence between the transmission symbol sequence and the subcarriers and a channel matrix indicating radio channel conditions between the transmitting antennas and the receiving antennaes; and
an estimation unit configured to estimate candidates of the symbols transmitted from the transmitting antennas based on the triangular matrix and a vector obtained by multiplying a received vector, which includes the signal components received by the receiving antennas, by the unitary matrix.

2. The receiving device as claimed in claim 1, wherein the signal detection unit further includes a determining unit configured to calculate metrics for the respective candidates of the symbols and to narrow down the candidates based on the metrics, the metrics indicating square Euclidean distances on a symbol constellation between received symbols and the candidates of the symbols.

3. The receiving device as claimed in claim 1, further comprising:
a permutation control unit configured to input a control signal for permuting rows or columns of a matrix product of the channel matrix and the weight matrix to the decomposition unit,
wherein the decomposition unit is configured to obtain the triangular matrix and the unitary matrix such that the product of the triangular matrix and the unitary matrix equals the matrix product the rows or the columns of which are permuted according to the control signal.

4. The receiving device as claimed in claim 3, wherein the permutation control unit is configured to generate the control signal such that when the estimation unit estimates the symbols according to an M algorithm, the symbols from one of the transmitting antennas corresponding to higher received power are estimated prior to the symbols from another one of the transmitting antennas corresponding to lower received power.

5. The receiving device as claimed in claim 3, wherein the permutation control unit is configured to generate the control signal such that the estimation unit estimates a first subcarrier component of the symbols transmitted from a first one of the transmitting antennas and then estimates a first subcarrier component of the symbols transmitted from a second one of the transmitting antennas.

6. A mobile communication system employing a single-carrier multiple-input multiple-output (MIMO) transmission scheme, comprising:
a transmitting device including
a mapping unit configured to map Fourier-transformed and weighted symbols in a transmission symbol sequence to subcarriers,
an inverse Fourier transform unit configured to inverse-Fourier-transform the mapped symbols, and
a transmitting unit configured to transmit a signal including the inverse-Fourier-transformed symbols from multiple transmitting antennas; and
a receiving device including
an extracting unit configured to Fourier-transform signals received by multiple receiving antennas and to extract signal components mapped to the subcarriers from the signals, and
a signal detection unit configured to estimate the symbols transmitted via the subcarriers by applying a QR decomposition algorithm to the extracted signal components,
wherein the signal detection unit includes
a decomposition unit configured to obtain a unitary matrix such that a product of the unitary matrix and a triangular matrix equals a product of a weight matrix determining a correspondence between the transmission symbol sequence and the subcarriers and a channel matrix indicating radio channel conditions between the transmitting antennas and the receiving antennas; and
an estimation unit configured to estimate candidates of the symbols transmitted from the transmitting antennas based on the triangular matrix and a vector obtained by multiplying a received vector, which includes the signal components received by the receiving antennas, by the unitary matrix.

7. The mobile communication system as claimed in claim 6, wherein the transmitting device is included in a user device and the receiving device is included in a base station.

8. A method for a mobile communication system employing a single-carrier multiple-input multiple-output (MIMO) transmission scheme and including a transmitting device and a receiving device, the method comprising:
the steps, performed by the transmitting device, of mapping Fourier-transformed and weighted symbols in a transmission symbol sequence to subcarriers,
inverse-Fourier-transforming the mapped symbols, and
transmitting a signal including the inverse-Fourier-transformed symbols from multiple transmitting antennas; and
the steps, performed by the receiving device, of
Fourier-transforming signals received by multiple receiving antennas and extracting signal components mapped to the subcarriers from the signals, and
estimating the symbols transmitted via the subcarriers by applying a QR decomposition algorithm to the extracted signal components, wherein in the estimating step,
a unitary matrix is obtained such that a product of the unitary matrix and a triangular matrix equals a product of a weight matrix determining a correspondence between the transmission symbol sequence and the subcarriers and a channel matrix indicating radio channel conditions between the transmitting antennas and the receiving antennas, and candidates of the symbols transmitted from the transmitting antennas are estimated based on the triangular matrix and a vector obtained by multiplying a received vector, which includes the signal components received by the receiving antennas, by the unitary matrix.

* * * * *